C. H. WILLIAMS.
SUSPENSION RIGGING FOR CLASP BRAKES.
APPLICATION FILED MAR. 16, 1917.
1,334,123.
Patented Mar. 16, 1920.
2 SHEETS—SHEET 1.
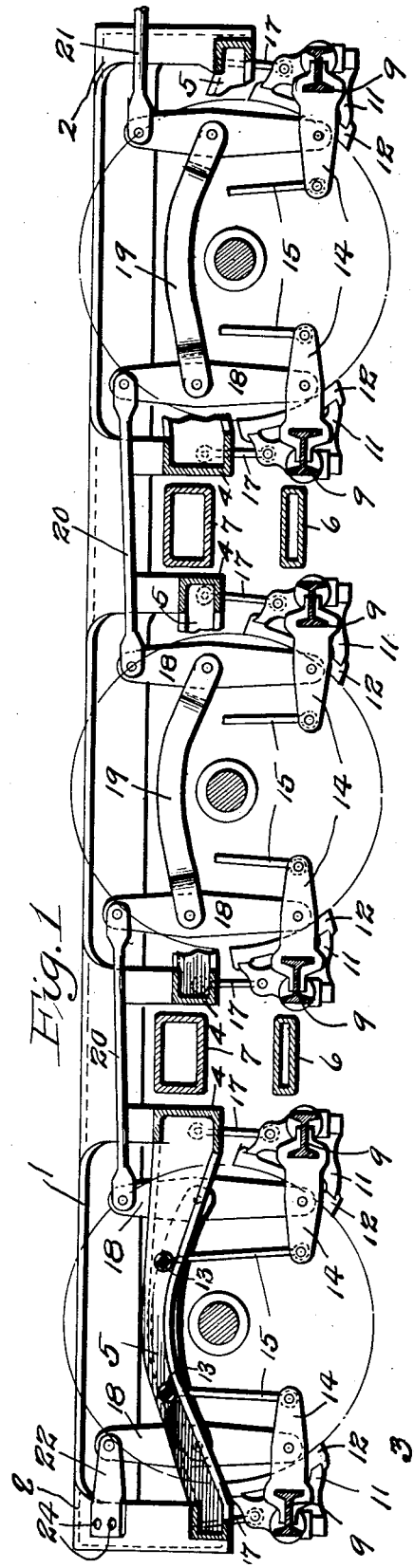
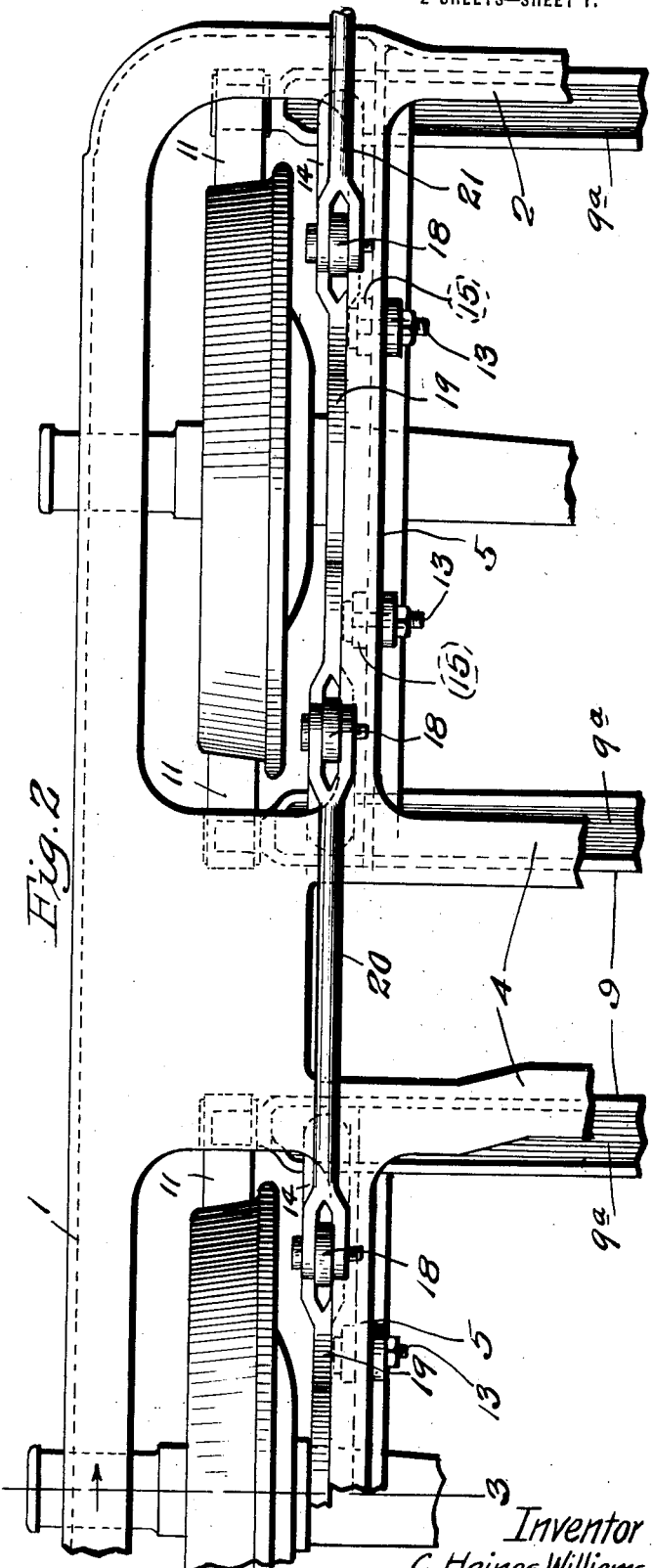
Inventor
C. Haines Williams
By F. R. Cornwall, Atty

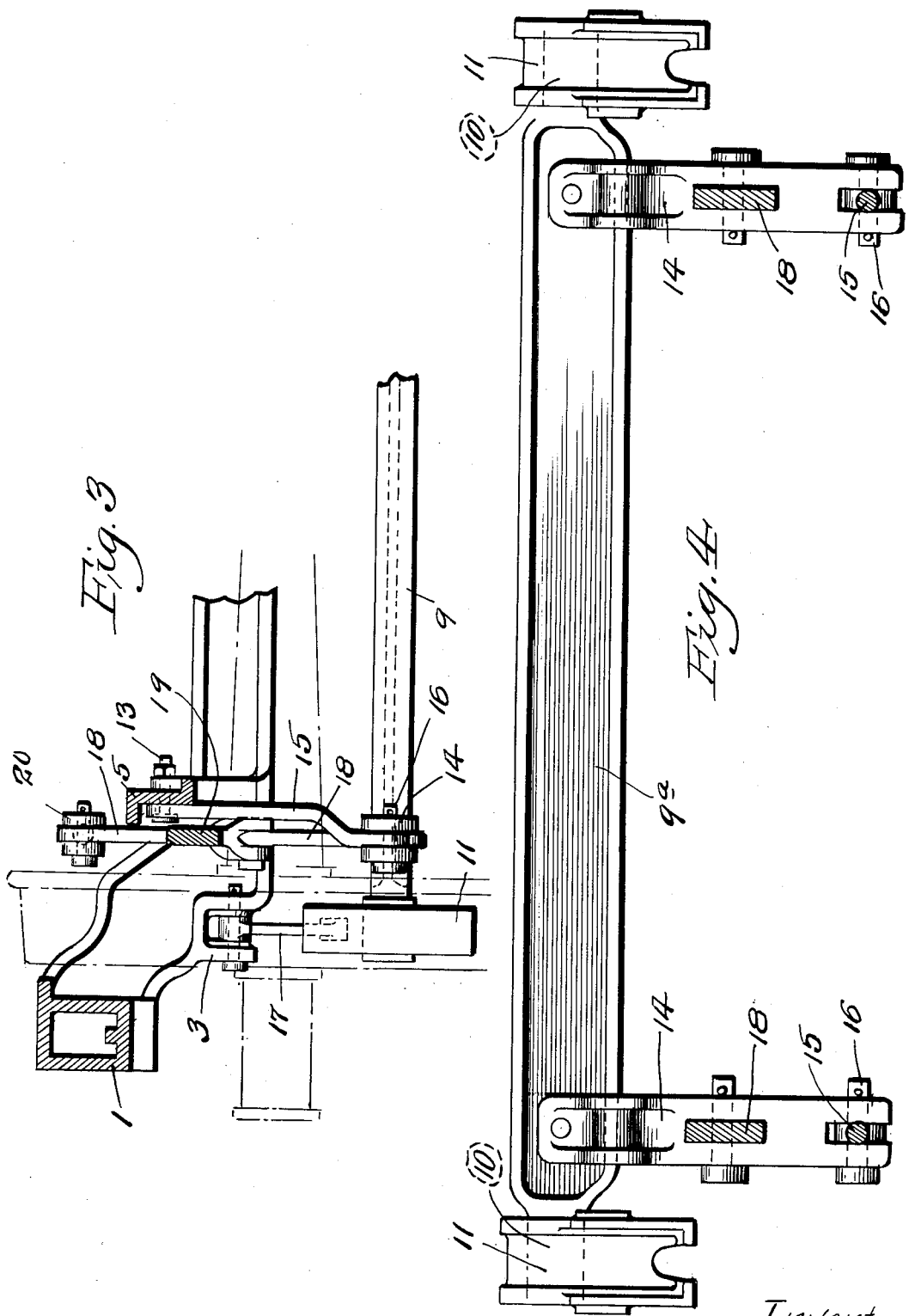

UNITED STATES PATENT OFFICE.

CHARLES HAINES WILLIAMS, OF CHICAGO, ILLINOIS, ASSIGNOR TO CHICAGO RAILWAY EQUIPMENT COMPANY, OF CHICAGO, ILLINOIS, A CORPORATION OF ILLINOIS.

SUSPENSION-RIGGING FOR CLASP-BRAKES.

1,334,123.  Specification of Letters Patent.  Patented Mar. 16, 1920.

Application filed March 16, 1917. Serial No. 155,238.

*To all whom it may concern:*

Be it known that I, CHARLES HAINES WILLIAMS, a citizen of the United States, residing at the city of Chicago, county of Cook, State of Illinois, have invented a certain new and useful Improvement in Suspension-Rigging for Clasp-Brakes, of which the following is a full, clear, and exact description, such as will enable others skilled in the art to which it appertains to make and use the same, reference being had to the accompanying drawings, forming part of this specification.

This invention relates broadly to railway rolling stock, and specifically to certain improvements in brake rigging. It has to do particularly with a brake rigging of the clasp brake type which, as is well known in the art, is characterized by the provision of brake beams at opposite sides of each wheel, which brake beams are adapted to be operated through a couple and equalizing arrangement to clasp the wheel in the braking operation.

It is the broad object of my invention to provide a superior rigging of this type whereby added strength, safety and accuracy of operation are secured and which rigging may be conveniently installed in existing trucks of standard or approved design without requiring alterations in the size or form thereof.

More specifically, it is my purpose to provide an arrangement for the operative suspension of the brake beam so constructed and arranged as to increase the security of its attachment to the truck, to arrange the operating connections in such fashion that the power is applied where the operated parts are best able to carry it, and to provide an arrangement whereby the brake beam and the brake heads carried thereby are guided with accuracy and precision into proper engagement with the wheels in the braking operation, and also properly guided in their movements upon the release of the brakes.

Other and further objects of my invention will be obvious or pointed out hereinafter, reference being had to the accompanying drawings wherein an illustrative embodiment is shown and in which—

Figure 1 is a vertical sectional view through a portion of the truck showing the brake rigging in elevation;

Fig. 2 is a quarter plan view of the truck;

Fig. 3 is a detail of the parts shown in vertical section substantially on line 3—3 of Fig. 2; and Fig. 4 is a top view of the brake beam.

Referring to these illustrations, it is to be observed that my invention is shown as applied to a truck of standard construction having an integrally cast frame which includes wheel pieces 1, end pieces 2, transom pieces 4 and axle guards 5, all arranged in the conventional relationship. From the frame so formed is supported a spring plank 6 on which is carried the truck bolster 7. These are all conventional parts of the truck structure and it will be understood further that the frame is provided with the customary pedestal jaws which engage the journal boxes in which the wheels 8 are journaled.

In operative association with each of the wheels 8 is disposed a pair of the brake beams 9 the construction of which may be observed in Fig. 4. Each brake beam includes a beam member 9ª equipped at its extremities with trunnions 10 upon which are adjustably mounted the brake heads 11 which in turn carry the shoes 12 arranged for coöperation with the wheel tires. Adjacent each of the trunnions 10 the beam member 9ª carries a fulcrum arm 14, which extends from the beam member in the direction of the brake shoe and which may be bifurcated as shown. At its outer end each fulcrum arm is pivotally attached to a hanger 15 in the form of a link which may have its lower extremity disposed in the bifurcated portion of the arm 14 and retained therein by a pivot pin 16. Each brake head 11 is equipped with a hanger 17 which may be in the form of a link or a stirrup member attached at its lower extremity to the head for oscillatory movement. At their upper extremities both the hangers 15 and 17 are attached to truck members for oscillatory movement relative thereto, in the embodiment shown the head hanger 17 being attached to the customary hanger brackets 3, and the arm hangers 15 being attached to wheel guards 5. These connections between the hangers and the truck members may be made by a simple arrangement such as the bolts 13 seated in any convenient web portions of the frame members. The lengths of the hangers 15 and 17, and their points of pivotal connection to the truck and brake beam, are such that when the brake beam is hanging loose the shoes 12 will stand away from the wheels, while, in movements of the brake beam toward and from the wheels in the braking operations, the brake beam will be maintained in proper parallelism with the truck frame and the brake heads will be moved in the proper direction toward the wheel axles to insure the shoes making surface contact with the wheel treads. By virtue of this suspension arrangement, it will be observed that the brake beam has four points of support, which are distributed over such area as is necessary to provide a very stable equilibrium.

This arrangement provides a very desirable suspension for the rest of the brake rigging. This rigging includes the brake levers 18 one of which is carried on each of the fulcrum arms 14, having its lower extremity pivotally connected thereto intermediate the beam member 9ª and the pin 16, the couple members 19, one of which connects each pair of brake levers associated with a wheel, and the pull rods 20, one of which connects the upper extremities of the adjacent brake levers associated with different wheels. The brake lever at one end of the truck has its upper extremity attached to a brake rod 21, while the brake lever at the other end of the truck has its upper extremity attached to a bracket 22 mounted on the truck frame at some convenient point by means of fastenings 24.

From the foregoing description, it is to be observed that the entire brake rigging is suspended and supported on the hangers 15 and 17, which hangers in turn are supported on conventional truck portions by very simple connections 13 which may be readily applied to convenient portions of the truck frame. By virtue of this arrangement, this improved brake rigging may be applied to any of various forms of trucks of accepted and standard design without requiring alterations in the frame parts. Furthermore, by virtue of the four point suspension of the beams, the rigging is maintained in stable equilibrium and held in proper alinement throughout the truck. As the power transmitting members have no bearing on the truck portions, loss by friction is reduced to a minimum. The application of power to the beam member 9ª through the fulcrum arms 14, is thus made approximately coincident with the final application of the power from the brake heads upon the wheels, thus obviating loss of power through flexion of the beam member and reducing the body stresses in the latter by shortening the leverage thereon. In addition to these several advantages, this improved construction may be manufactured, installed and maintained at a minimum of cost because of its inherent strength, its simplicity of construction and the few parts which it requires.

While the embodiment above described is what I now believe to be the best form of the invention, I am aware that it is not the only form, and it is not to be regarded as the only embodiment within the scope of the appended claims.

What I claim as my invention is:

1. In a truck, a brake rigging including beam members having brake heads at their extremities and fulcrum arms adjacent the brake heads, supporting members attached to the brake heads and to the fulcrum arms at points removed from the beam members, said supporting members being attached to truck portions to maintain the brake beams thereon, and members supported by said fulcrum arms for transmitting operative movement to the brake beams.

2. In a brake rigging, the combination of a beam member carrying brake heads at its extremities, fulcrum arms attached to the beam member adjacent the brake heads and extending from the beam member in the direction of the heads, supporting members having oscillatory attachment to the heads, other supporting members having oscillatory attachment to the fulcrum arms in front of the beam, all of said supporting members being arranged for oscillatory support upon the truck, and members supported on the fulcrum arms for transmitting operative movement to the beam.

3. In a brake rigging, the combination of a beam member, brake heads supported adjacent its extremities, fulcrum members supported on the beam adjacent the brake heads, supporting members affording separate supporting attachment for the brake heads and the fulcrum arms, and power transmitting members arranged to be supported by the supporting members, said supporting members being arranged for oscillatory attachment to truck portions.

4. In a truck, a brake rigging including beam members disposed for association with a truck wheel, brake heads carried adjacent the extremities of said beam members, arms carried by the beam members adjacent the brake heads, separate supporting members attaching the brake heads to truck portions and the arms to truck portions to permit oscillatory movement of the beam member to and from the wheel, and power transmitting members coöperatively associated with the beams and supported from the truck by the said supporting members.

5. In a brake rigging, the combination of a beam member carrying brake heads at its extremities and fulcrum arms adjacent the heads, and hangers connected severally with the heads and fulcrum arms to afford an oscillatory four-point support for the beam member.

6. In a brake rigging, the combination of a beam member, brake heads and fulcrum arms carried by the beam member adjacent its extremities, hangers attached severally to said brake heads and fulcrum arms for providing a four-point support for the beam member, and operating members associated with the fulcrum arms.

7. In a brake rigging, the combination of a beam member, brake heads carried thereby adjacent its extremities, fulcrum arms carried by the beam member adjacent the brake heads, operating levers having effective connection with the fulcrum arms, and hangers for supporting said portions disposed on both sides of the operating levers.

8. In a brake rigging, the combination of a beam member, brake heads carried thereby adjacent its extremities, fulcrum arms carried by the beam member adjacent the brake heads, hangers having connection severally with the brake heads and fulcrum arms and with truck portions to afford four points of support for the brake beam, and an operating lever supported by the brake beam and having operative association therewith within the area of the said four points of support.

9. In brake mechanism, the combination of a frame, wheels carrying said frame, brake beams applied to both sides of each pair of wheels, fulcrum members having one end attached to the brake beams near the end thereof, levers pivotally connected to an intermediate portion of said fulcrum members, and supported hangers pivotally connected to the other end of said fulcrum members.

10. In brake mechanism, the combination of a frame, wheels carrying said frame, brake mechanism having brake beams applied to both sides of each pair of wheels, fulcrum members attached to the brake beams near the ends thereof, levers pivotally connected to said fulcrum members, and hangers pivotally connected at one end to the frame and at the other end to the fulcrum members to support the brake mechanism.

In testimony whereof I hereunto affix my signature, in the presence of two witnesses, this 12th day of March, 1917.

CHARLES HAINES WILLIAMS.

Witnesses:
    EDWIN G. BUSSE,
    EDWARD T. WALKER.